United States Patent [19]
Guests

[11] Patent Number: 5,549,865
[45] Date of Patent: Aug. 27, 1996

[54] METHOD FOR MANUFACTURE OF AN ELASTOMERIC TUBE COUPLING BODY

[76] Inventor: John D. Guests, "Iona", Cannon Hill Way, Brays Maidenhead, Berkshire, United Kingdom

[21] Appl. No.: 335,478

[22] Filed: Nov. 7, 1994

Related U.S. Application Data

[63] Continuation of Ser. No. 227,562, Apr. 14, 1994, abandoned, which is a continuation of Ser. No. 897,658, Jun. 12, 1992, abandoned.

[30] Foreign Application Priority Data

Jun. 12, 1991 [GB] United Kingdom ............... 9112617

[51] Int. Cl.⁶ ........................ B29C 45/44; B29C 57/06
[52] U.S. Cl. ............... 264/318; 264/328.1; 264/336
[58] Field of Search ...................... 264/318, 328.1, 264/334, 336; 425/DIG. 58

[56] References Cited

U.S. PATENT DOCUMENTS

| | | | |
|---|---|---|---|
| 3,193,884 | 7/1965 | Haynie et al. | 425/DIG. 58 |
| 3,899,567 | 8/1975 | Gorman | 264/318 |
| 4,005,883 | 2/1977 | Guest | 285/322 |
| 4,113,829 | 9/1978 | Bowker et al. | 264/318 |
| 4,127,632 | 11/1978 | Anger | 264/318 |
| 4,178,023 | 12/1979 | Guest | 285/323 |
| 4,264,661 | 4/1981 | Brandolf | 264/318 |
| 4,394,343 | 7/1983 | Acda et al. | 264/318 |
| 4,428,899 | 1/1984 | van Manen | 264/318 |
| 4,573,716 | 3/1986 | Guest | 285/323 |
| 4,606,783 | 8/1986 | Guest | 156/73.1 |
| 4,637,636 | 1/1987 | Guest | 285/38 |
| 4,645,246 | 2/1987 | Guest | 285/323 |
| 4,657,286 | 4/1987 | Guest | 285/323 |
| 4,722,560 | 2/1988 | Guest | 285/323 |
| 4,787,596 | 11/1988 | Folding et al. | 425/DIG. 58 |
| 4,824,148 | 4/1989 | Grabowski | 285/110 |
| 4,867,484 | 9/1989 | Guest | 295/174 |
| 4,958,858 | 9/1990 | Guest | 285/322 X |
| 5,042,848 | 8/1991 | Shiozaki | 285/323 X |

FOREIGN PATENT DOCUMENTS

| | | |
|---|---|---|
| 0351466 | 1/1990 | European Pat. Off. . |
| 2131903 | 6/1984 | United Kingdom . |
| 2191899A | 12/1987 | United Kingdom . |

*Primary Examiner*—Jill L. Heitbrink
*Attorney, Agent, or Firm*—Baker & Daniels

[57] ABSTRACT

A method for forming a tube coupling body having a throughway open at one end of the body to receive a tube. The throughway has a portion of enlarged internal diameter adjacent said open end to provide a cavity to receive a device for locking a tube in the body and a second portion of equivalent internal diameter to the external diameter of the tube to be received in the coupling body with a close fit. The body is formed from an elastomeric material such that the body can be stripped from the tooling used to form the throughway including said enlarged internal diameter portion by stretching the body over the tooling and by virtue of its elastomeric property, returns to its moulded shape.

1 Claim, 8 Drawing Sheets

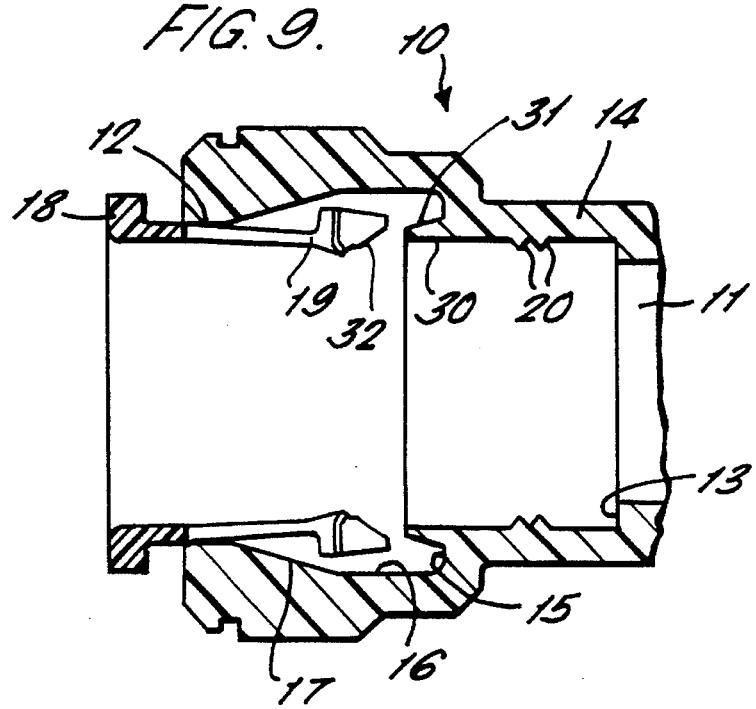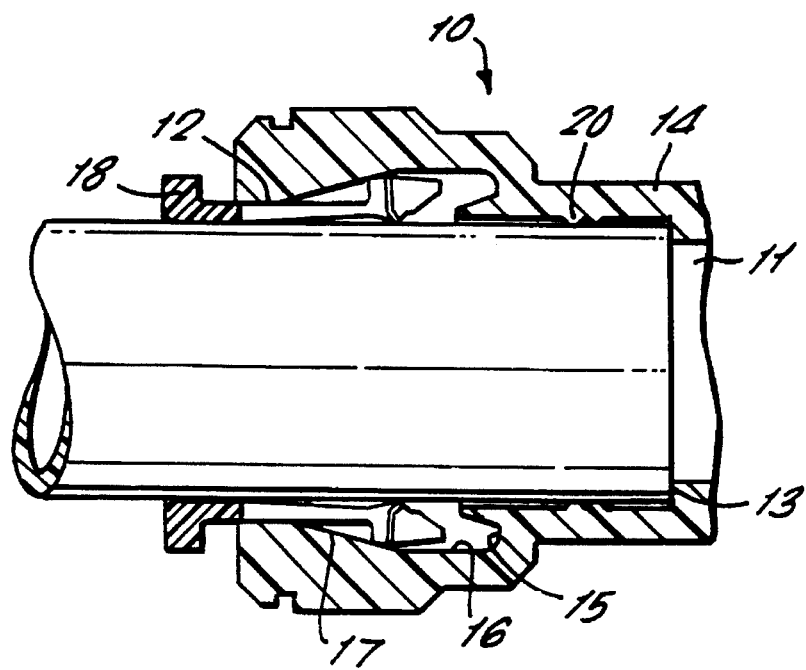

METHOD FOR MANUFACTURE OF AN ELASTOMERIC TUBE COUPLING BODY

This is a continuation of application Ser. No. 08/227,562, filed Apr. 14, 1994, now abandoned, which is a continuation of application Ser. No. 07/897,658, filed Jun. 12, 1992 now abandoned.

BACKGROUND OF THE INVENTION

1. Field of the Invention

This invention relates to tube coupling bodies.

2. Background Prior Art

U.S. Pat. No. 4,005,883 discloses a tube coupling comprising an open ended body having a throughway to receive a tube with a collet in said open end to grip and lock the tube in the body. A separate sealing ring is provided to seal with the tube in the body. Other similar arrangements are shown in U.S. Pat. Nos. 4,178,023; 4,573,716; 4,606,783; 4,637,636; 4,645,246; 4,657,286; 4,722,560 and 4,867,484.

SUMMARY OF THE INVENTION

The invention provides a tube coupling body having a throughway open at one end of the body to receive a tube, the throughway having a portion of enlarged internal diameter adjacent said open end to provide a cavity to receive a device for locking a tube in the body and a second portion of equivalent internal diameter to the external diameter of the tube to be received in the coupling body with a close fit, the body being formed from an elastomeric material such that the body can be stripped from the tooling used to form the throughway including said enlarged internal diameter portion by stretching the body over the tooling and by virtue of its elastomeric property, returns to its moulded shape.

BRIEF DESCRIPTION OF THE DRAWINGS

FIGS. 9 to 15 show further modifications to the coupling bodies of FIGS. 1 to 7 respectively.

DESCRIPTION OF THE PREFERRED EMBODIMENTS

Figure 1:
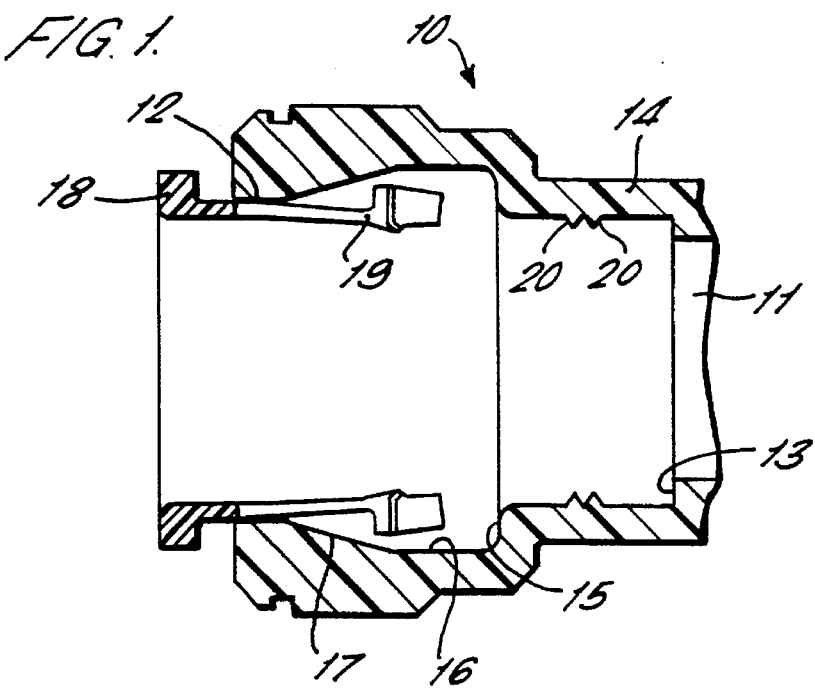
FIG. 1 is a sectional view through a tube coupling body and collet for locking a tube in the body.
Figure 2:
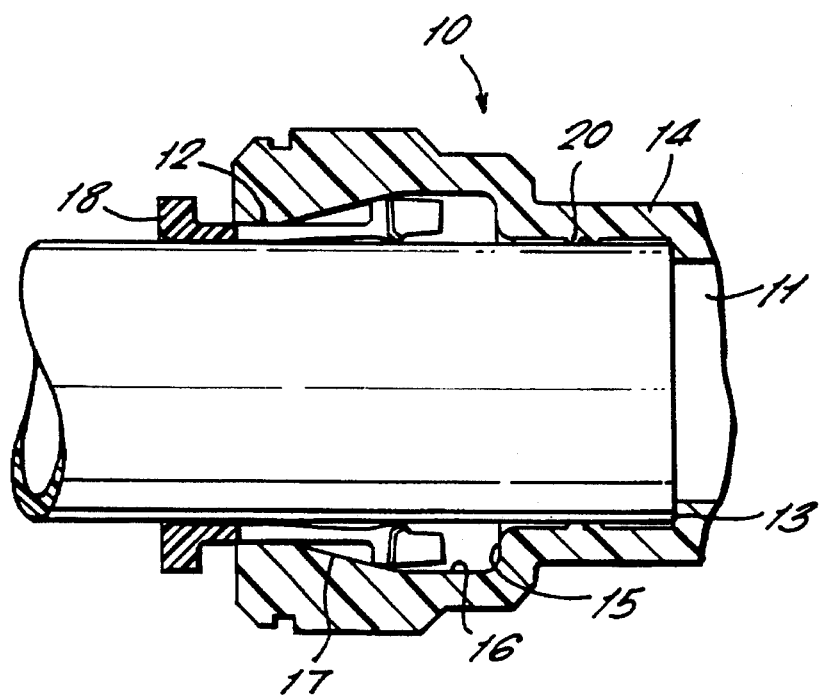
FIG. 2 is a similar view to FIG. 1 showing a tube locked in place by the collet.

Referring firstly to FIGS. 1 and 2 of the drawings, there is shown a tube coupling body indicated generally at 10, formed with a throughway 11 having an open end 12.

The throughway 11 is enlarged in diameter by a step 13 facing towards the open end 12 of the coupling body to provide an enlarged diameter portion 14 the internal diameter of which is intended to provide a close fit with the external diameter of a tube to be located in the coupling body as described below. The enlarged diameter portion 14 of the throughway terminates in a further step 15 facing towards the open end of the throughway leading to a further enlarged portion of the throughway 16 from which a tapered surface 17 leads reducing in diameter to the open end of the throughway. The further enlarged portion of the throughway provides a cavity to receive a multi-fingered collet 18 projecting into the throughway from the open end 12 thereof to receive and grip the tube to be locked in the coupling body by interaction between the collet fingers 19, the tapered cam surface 17 of the throughway and the external surface of the tube.

The coupling body is an injection moulded rubber or rubber like material such as a material manufactured by Dupont under the tradename HYTREL which is a polyester elastomer. Polyurethanes can also be used as can other equivalent materials. The material has sufficient elasticity to allow certain strain without permanent deformation.

The enlarged portion 14 of the throughway is formed with a pair of integrally moulded inverted V-section sealing rings 20 located side by side one another midway along the portion 14 of the throughway to engage and seal with the external surface of a tube inserted in the coupling body. The tube engages the step or shoulder 13 and is held in the coupling body by the collet 18 as illustrated in FIG. 2 of the drawings.

Figure 3:
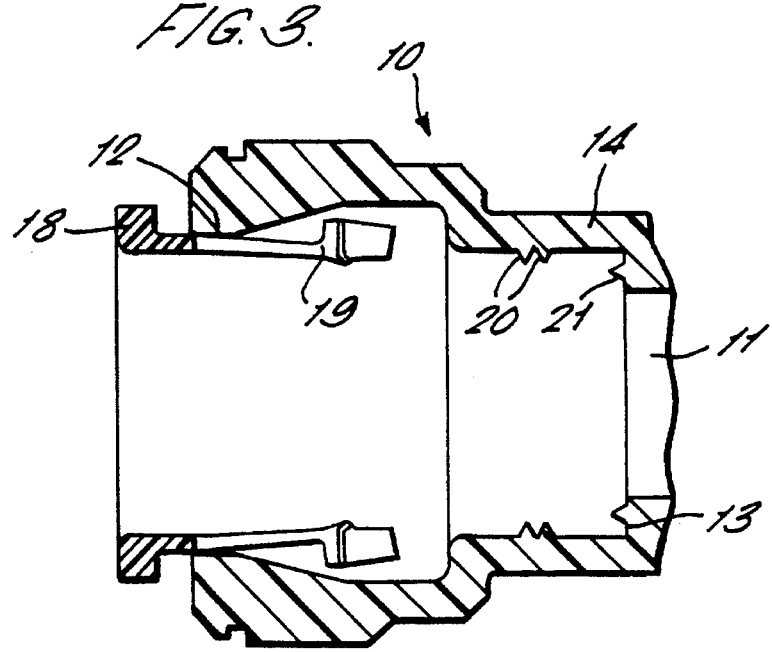
FIG. 3 is a similar view to that of FIG. 1 showing a modified arrangement of the coupling body.

FIG. 3 shows a further arrangement in which an additional integral V-section sealing ring 21 is provided on the shoulder 30 to minimize the space between the tube and coupling body which can be penetrated by fluid flowing through the coupling and remain trapped.

Figure 4:
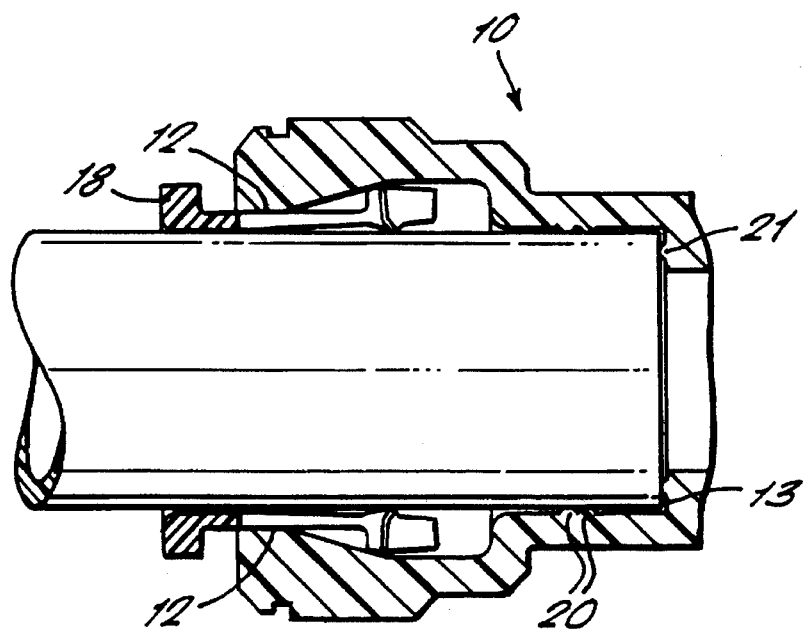
FIG. 4 is a similar view to FIG. 3 with a tube in place.

FIG. 4 shows the coupling of FIG. 3 with the pipe in situ engaging the sealing ring 21 on the step or shoulder 13.

Figure 5:
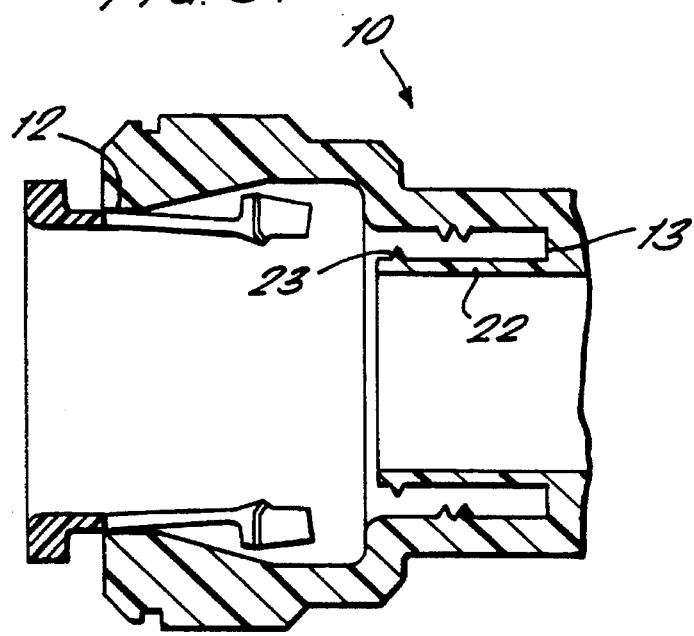
FIG. 5 shows a further modification to the coupling body of FIG. 1.
Figure 6:
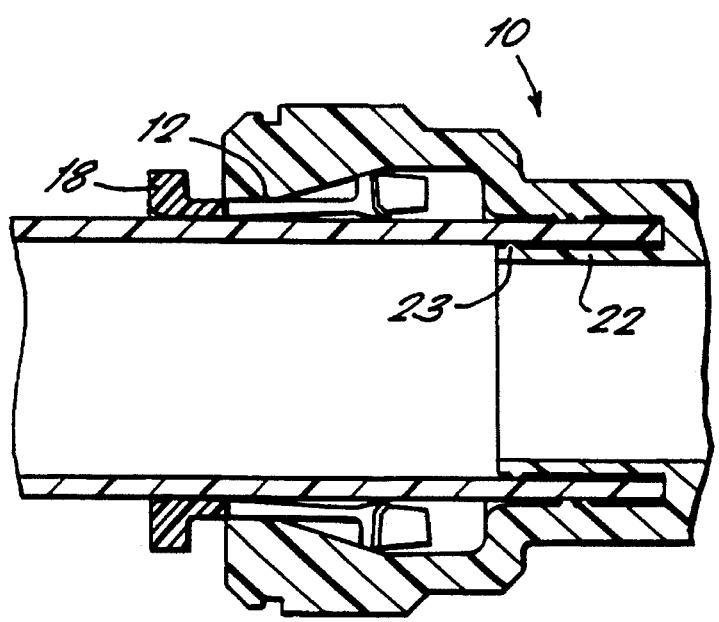
FIG. 6 is a similar view to that of FIG. 5 with a tube in place.

FIG. 5 of the drawings shows a further arrangement in which an integral sleeve 22 is formed around the inner periphery of the step 13 and projects forwardly towards the open end 12 of the coupling body. The sleeve 22 fits within the tube to be received in the coupling body and is formed with an external annular sealing ring 23 adjacent the free end thereof to seal in the tube as shown in FIG. 6.

The coupling body illustrated in any of the arrangements referred to above can be in the form of a "T" to provide a coupling for connecting three pipes together, an elbow for connecting two pipes together extending at right angles to one another, or a closed coupling body for capping off the end of a tube.

Figure 7:
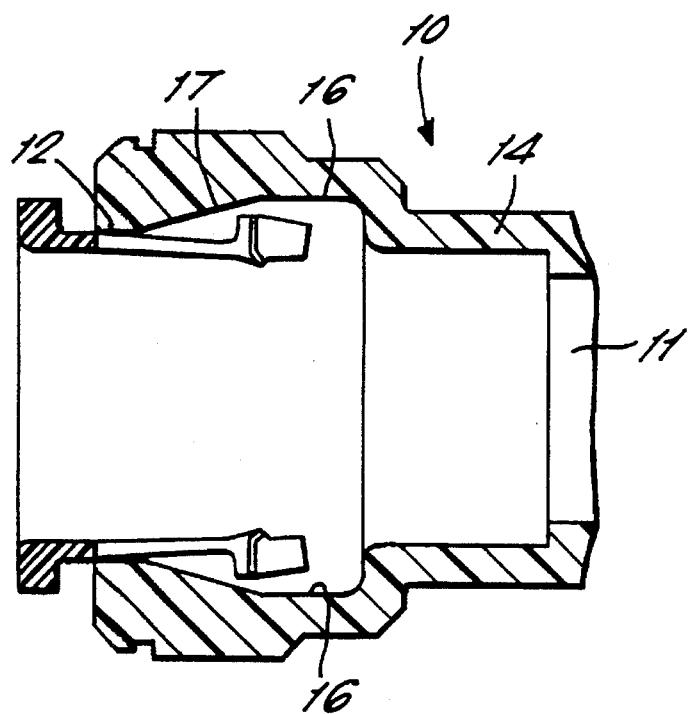
FIGS. 7 and 8 show further forms of coupling bodies.
Figure 8:
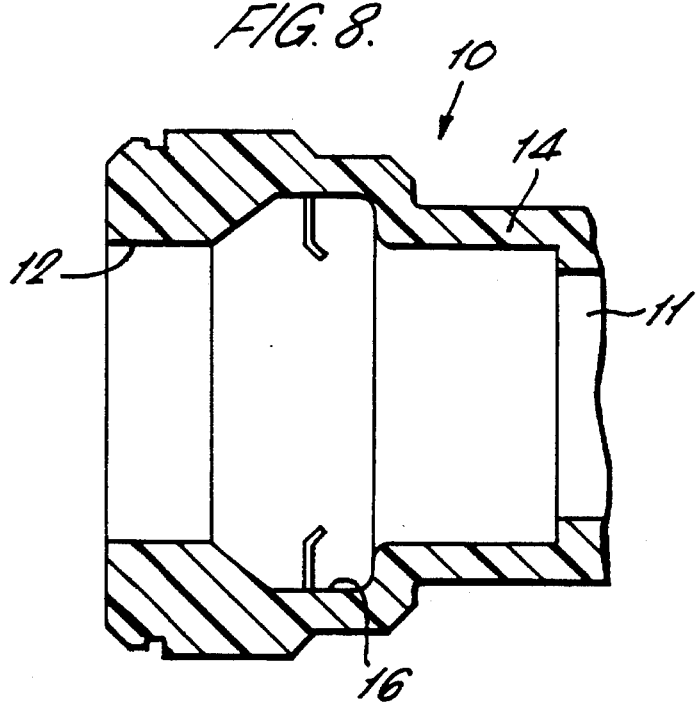
Figure 11:
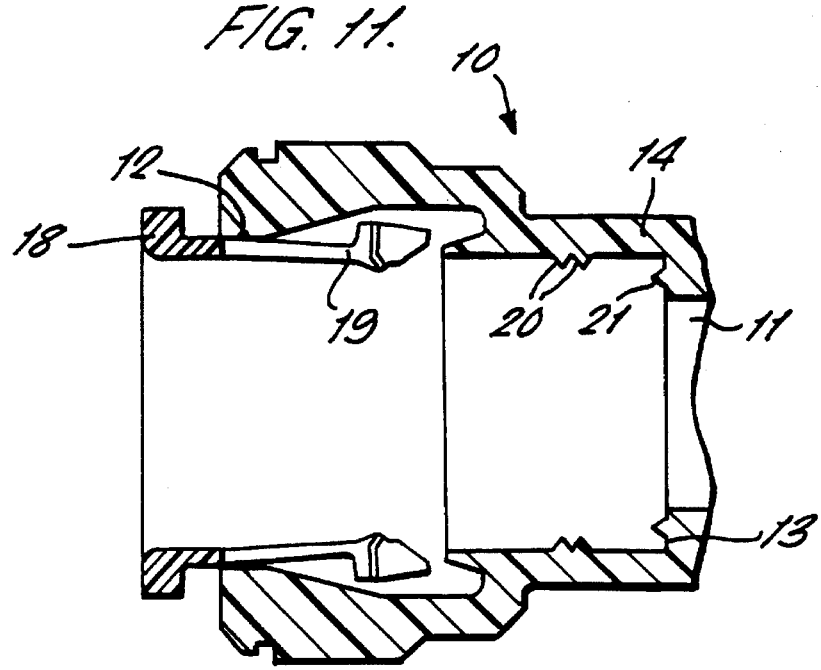
Figure 12:
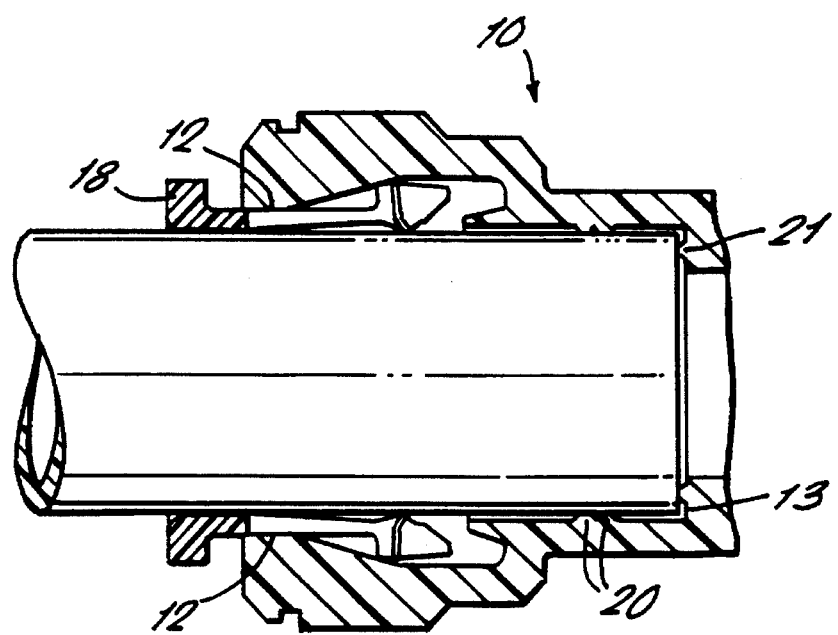
Figure 13:
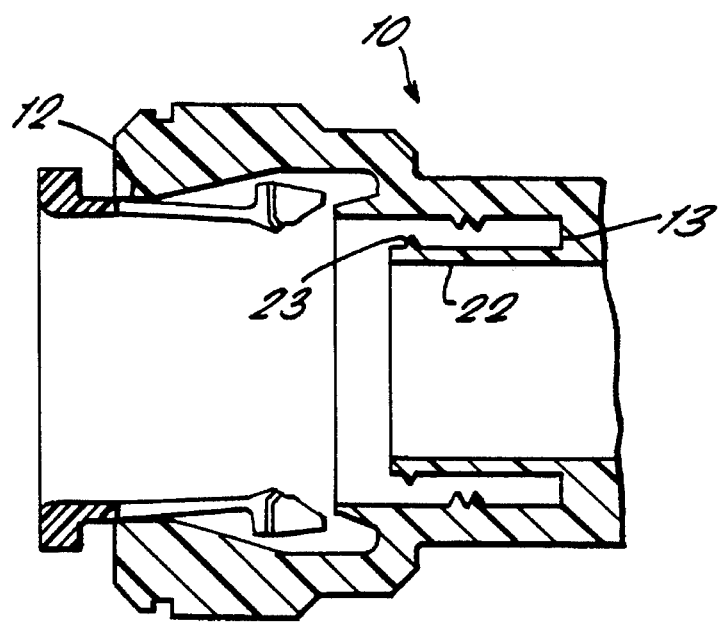
Figure 14:
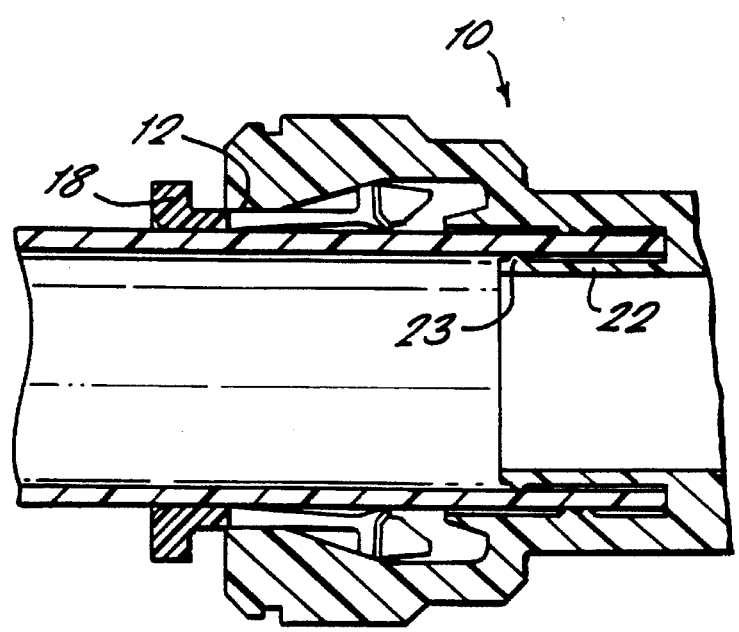
Figure 15:
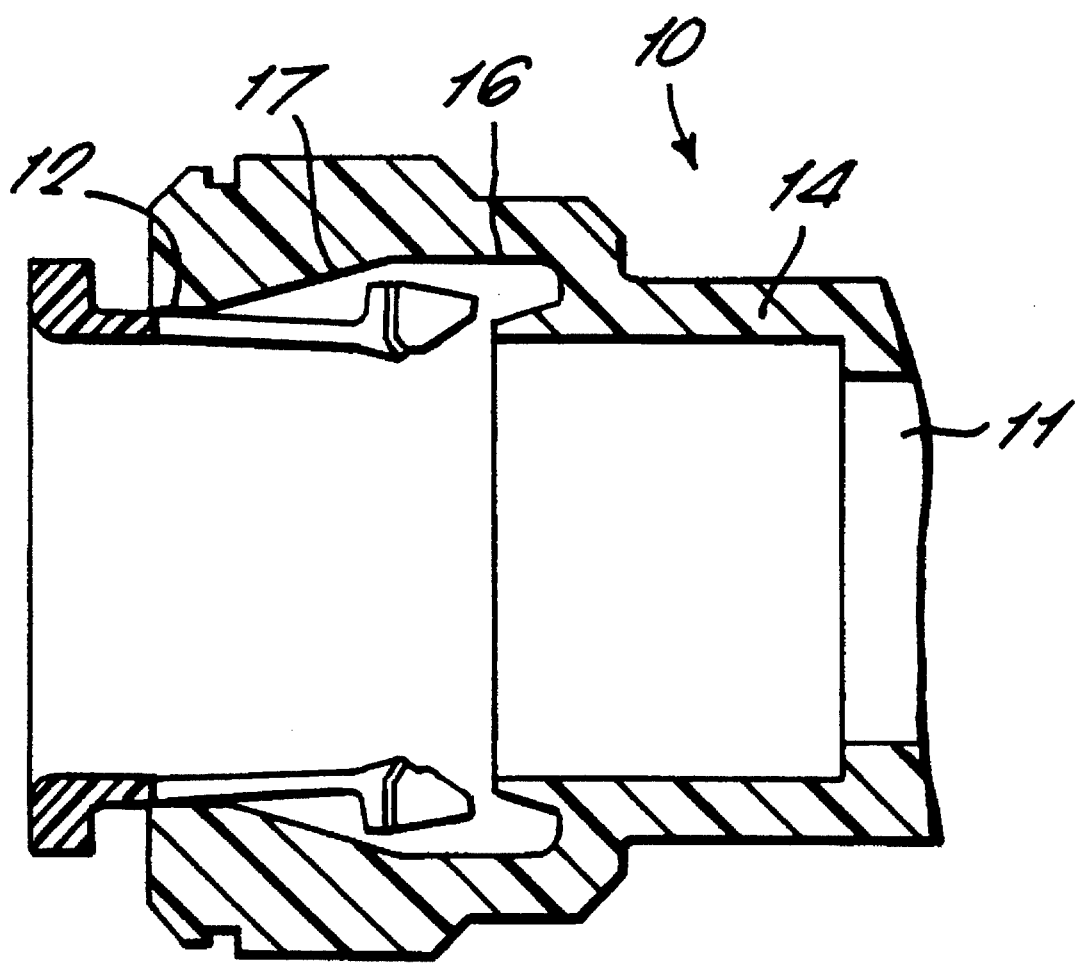

Reference is now made to FIGS. 7 and 8 of the drawings which show further forms of coupling bodies generally similar to those described above and moulded in elastomeric material. As indicated earlier, the coupling body is formed with an enlarged diameter portion 16 connected by a tapered cam surface 17 which leads to the open end 12 of the coupling body and within which a device for locking a tube in the coupling body is located which may be in the form of a collet as illustrated in FIG. 7 or a grab ring arrangement as illustrated in FIG. 8. Normally the coupling body is formed as two parts, that is a main body portion containing the enlarged internal cavity portion 16 and an end cap containing the tapered cam surface and open end 12 and the two parts are subsequently joined by ultrasonic welding. This is expensive and complicated in that two sets of tooling are required with the addition of the joining operation and can be avoided if an elastomeric material is used for forming the coupling body which can stretch and thereby deform as the tooling forming the internal part of the coupling body is extracted through the open end 12 of the coupling body and which then returns to its moulded condition as shown in FIGS. 7 and 8. Thus the coupling body is formed, in effect, with an integral end cap and the elasticity of the material used for the coupling body allows the tooling used to form the throughway to be withdrawn after moulding of the body through the end cap which returns to its moulded form after the tooling has been extracted.

FIGS. 9 to 15 show the coupling bodies of FIGS. 1 to 7 with the addition of an integral internal collet release ring 30 projecting from the portion 14 of the throughway into the enlarged portion 16 of the throughway occuplied by the collet. The ring 30 has a frusto-conical outer face 31 to provide a ramp which is engageable with inner tapers 32 on the ends of the collet fingers to displace the fingers radially outwardly when the collet is pressed into engagement with the ring. The collet fingers are thereby released from a tube extending through the collet allowing the collet to be extracted from the coupling body.

I claim:

1. A method of making a tube coupling body having a throughway open at one end of the body to receive a tube, the throughway having a first cylindrical portion of equivalent internal diameter to the external diameter of the tube to be received with a close fit, a second cylindrical portion connected to said first cylindrical portion and of larger internal diameter than said open end and having a cavity to receive a device for locking in said coupling body the tube to be received, and a third, tapered portion between said second portion and said open end, said coupling body increasing in thickness from said second portion to said open end, in which a tube locking means is received to lock a tube in the throughway, the method comprising:

injection molding the coupling body using tooling which forms said throughway having an enlarged diameter portion which tapers to a narrowed diameter portion and a cylindrical outer surface, molding the coupling body in one piece of an elastomeric material;

releasing the coupling body from the tooling which forms the internal part of the coupling body by drawing the tooling through the tapered portion of the throughway out of said open end of the coupling body by stretching the wall of the coupling body as the tooling is withdrawn;

and then allowing the coupling body to return to its molded shape after extraction of the tooling through only the elasticity of the material from which the coupling body is formed and to cool the coupling body to the normal operating temperature of the coupling body.

\* \* \* \* \*

UNITED STATES PATENT AND TRADEMARK OFFICE
CERTIFICATE OF CORRECTION

PATENT NO. : 5,549,865
DATED : August 27, 1996
INVENTOR(S) : John D. Guest

It is certified that error appears in the above-indentified patent and that said Letters Patent is hereby corrected as shown below:

On the title page: Item [76], delete "John D. Guests" and substitute therefor --John D. Guest--.

Signed and Sealed this

Twelfth Day of November, 1996

Attest:

BRUCE LEHMAN

*Attesting Officer*     *Commissioner of Patents and Trademarks*